(12) United States Patent
Geiger

(10) Patent No.: US 11,187,278 B2
(45) Date of Patent: Nov. 30, 2021

(54) FRICTION SURFACE CLUTCH AND ANCILLARY UNIT OF A MOTOR VEHICLE

(71) Applicant: LICOS Trucktec GmbH, Markdorf (DE)

(72) Inventor: Sigmund Geiger, Markdorf (DE)

(73) Assignee: LICOS Trucktec GmbH, Markdorf (DE)

( * ) Notice: Subject to any disclaimer, the term of this patent is extended or adjusted under 35 U.S.C. 154(b) by 274 days.

(21) Appl. No.: 15/945,998

(22) Filed: Apr. 5, 2018

(65) Prior Publication Data
US 2018/0291965 A1  Oct. 11, 2018

(30) Foreign Application Priority Data

Apr. 10, 2017 (DE) ........................ 10 2017107 613.1

(51) Int. Cl.
*F16D 13/24* (2006.01)
*F16D 25/0632* (2006.01)
*F16D 13/04* (2006.01)

(52) U.S. Cl.
CPC ............. *F16D 13/24* (2013.01); *F16D 13/04* (2013.01); *F16D 25/0632* (2013.01)

(58) Field of Classification Search
CPC .......... F16D 13/04; F16D 13/24–13/36; F16D 25/0632; F16D 25/08; F16D 25/082; F16D 23/12; F16D 23/123
USPC ...................................................... 192/93 A
See application file for complete search history.

(56) References Cited

U.S. PATENT DOCUMENTS

| | | | | |
|---|---|---|---|---|
| 1,438,486 A | * | 12/1922 | Gorman | F16D 23/12 192/93 A |
| 1,581,678 A | | 4/1926 | Chesley | |
| 2,057,761 A | * | 10/1936 | Bolton | F16D 13/04 192/54.5 |
| 4,022,308 A | | 5/1977 | Hurst | |
| 4,433,766 A | * | 2/1984 | Teraoka | F16D 41/22 192/50 |

(Continued)

FOREIGN PATENT DOCUMENTS

| | | |
|---|---|---|
| DE | 27 08 966 A1 | 11/1977 |
| DE | 10 2007 021 791 A1 | 3/2009 |
| EP | 1 916 434 A1 | 4/2008 |

OTHER PUBLICATIONS

German Search Report (Application No. 10 2017 107 613.1) dated Dec. 4, 2017.

*Primary Examiner* — Richard M Lorence
(74) *Attorney, Agent, or Firm* — Burr & Brown, PLLC

(57) ABSTRACT

A friction surface clutch having two conical friction surface pairs each with an inner friction surface element and an outer friction surface element, wherein the inner friction surface element is mounted axially displaceable with respect to a rotational axis, and wherein a frictionally locking connection is set up and canceled in a manner which is dependent on the axial displacement position of the inner friction surface element. The inner friction surface element is coupled to a separate transmission element such that the inner friction surface element and the transmission element can be rotated jointly about the rotational axis, with the coupling being set up via a bearing contact between a guide surface on the inner friction surface element and a countersurface on the transmission element.

11 Claims, 6 Drawing Sheets

(56) References Cited

U.S. PATENT DOCUMENTS 4,782,720 A * 11/1988 Teraoka .................. F16D 41/22
                                                          192/35
2010/0065396 A1    3/2010  Wolf et al.

* cited by examiner

FRICTION SURFACE CLUTCH AND ANCILLARY UNIT OF A MOTOR VEHICLE

This application claims the benefit under 35 USC § 119(a)-(d) of German Application No. 10 2017 107 613.1 filed Apr. 10, 2017, the entirety of which is incorporated herein by reference.

FIELD OF THE INVENTION

The present invention relates to a friction surface clutch and ancillary unit of a motor vehicle.

BACKGROUND OF THE INVENTION

Friction clutches for the transmission of torque which act via friction surfaces which are oblique with respect to the rotational axis and can be moved into a frictionally locking connection in a switchable manner are known. For example, clutches of this type are used to drive ancillary units in motor vehicles. The friction switching clutches can be actuated pneumatically, hydraulically, electromotively or electromagnetically.

Modern friction switching clutches and corresponding ancillary units have to satisfy complex requirements, in particular, with regard to a compact overall design and with regard to the switching behavior.

SUMMARY OF THE INVENTION

The present invention is based on the object of advantageously providing a friction surface clutch of the type mentioned at the outset and a motor vehicle ancillary unit having a clutch of this type, in particular, with regard to a space-saving overall design and an advantageous switching behavior.

The present invention proceeds from a friction surface clutch having at least two friction surfaces which can be moved into a frictionally locking connection, a conical friction surface pair with an inner friction surface element and an outer friction surface element being provided, and the inner friction surface element being mounted such that it can be displaced axially with respect to a rotational axis, and it being possible for the frictionally locking connection to be set up and canceled in a manner which is dependent on the axial displacement position of the inner friction surface element. By way of the friction surface clutch, a driven element such as a drive rotor can be connected releasably in a frictionally locking manner to an element to be driven such as an output shaft.

In the following text, the terms "axial," "radial" and "circumferential" relate to the rotational axis of the friction surface clutch.

With regard to the relative position of the friction surface elements, the inner friction surface element is radially on the inside and the outer friction surface element is radially on the outside adjacently with respect to the inner friction surface element. The driven element can be coupled or connected either to the inner or to the outer friction surface element. In a correspondingly inverse manner, the element to be driven can be coupled or connected to the inner or to the outer friction surface element. The torque which can be transmitted is preferably transmitted from the radial outside to the radial inside.

The conical friction surface pair comprises a first friction surface which is conical with respect to the rotational axis and is of radially outer circumferential configuration on the inner friction surface element. For example, there is an outer circumferential annular face as an annularly conical first friction surface on an inner friction surface element which is configured as an annular disk. The friction surface pair comprises a second friction surface on the outer friction surface element, which second friction surface is adjacent radially on the outside with respect to the first friction surface, the second friction surface being of correspondingly conical or annularly conical design in a fitting manner with respect to the first friction surface.

The two friction surfaces are preferably of circumferentially closed or circumferentially continuous configuration, in order to obtain as great a friction area as possible over a predefined axial width of the first and second friction surface.

The first and second friction surface which can be coupled to one another are preferably designed in such a way that, in the case of the frictional connection or in the case of a frictionally locking connection which is set up between the driving element and the element to be driven, the two friction surfaces are situated at least virtually completely mutually in a frictional connection. The two friction surfaces can have the same extent or width in the axial direction or can differ in terms of their size. In the case of a friction lining which is wearing out, a friction surface on the outer friction surface element is advantageously somewhat larger than a friction surface on the inner friction surface element.

If the frictionally locking connection is canceled or the clutch is switched or open, an air gap exists between the first and second friction surface and between the inner and outer friction surface element.

The frictional connection is set up and canceled again by way of an axial relative movement between the inner and the outer friction surface element, whereby the friction surface clutch can be switched in a reversible manner.

The outer friction surface element which can be rotated about the rotational axis comprises, for example, an annular element with a comparatively small radial dimension. An annular disk element which is arranged radially inwardly adjacently with respect to the outer friction surface element forms the inner friction surface element which is of annular disk-like configuration, in particular, with a central receiving opening for a rotor which can be rotated about the rotational axis.

The maximum torque which can be transmitted in the frictional connection is also dependent on the force which presses the inner friction surface element and the outer friction surface element against one another in the axial direction.

The friction surface clutch can be configured, for example, as an annular disk-shaped structural unit with the central receiving opening, with components which are held together or screwed together in the axial direction.

The friction surface elements and the associated friction surfaces can consist of or be coated with a preferably hardened and/or galvanically coated metal material or a suitable plastic material.

The core concept of the present invention lies in the fact that the inner friction surface element is coupled to a transmission element which is separate from the inner friction surface element, with the result that the inner friction surface element and the transmission element can be rotated jointly about the rotational axis, the coupling being set up via a bearing contact between a guide surface on the inner friction surface element and a countersurface on the transmission element, and the guide surface and the countersurface being adapted to one another in such a way that, in the case of driving of the inner friction surface element by way of friction between the at least two friction surfaces, an axial displacement movement of the inner friction surface element takes place in one direction, with the result that the frictionally locking connection between the inner friction surface element and the outer friction surface element can be reinforced. The guide surfaces and the countersurface are designed in such a way that, in all the operating and switching states of the friction surface clutch, the bearing contact between the guide surface and the associated countersurface is always maintained. The coupling or connection between the inner friction surface element and the transmission element takes place solely via the guide surface and the countersurface.

The friction surface clutch according to the present invention is configured, for example, as a single cone clutch with precisely one inner and precisely one associated outer friction surface element, or preferably as a double cone clutch which has two friction surface pairs with in each case an inner friction surface on the inner friction surface element and an associated outer friction surface on the outer friction surface element. The double cone clutch is preferably of symmetrical construction with respect to an axial center plane.

Furthermore, in the case of a double cone clutch, the transmission element is preferably symmetrical with respect to an axial center plane of the transmission element.

By way of the friction surface clutch according to the present invention or the transmission element in interaction with the inner friction surface element, a self-boosting action is achieved, in order to set up and/or in order to cancel the frictionally locking connection. The advantage in comparison with known cone surface clutches lies in the lower necessary forces for overcoming a switching state with a frictionally locking connection which is set up or canceled. It is also advantageous by way of the present invention, in particular, that the lower forces for releasing the frictionally locking connection have to be applied only for a comparatively brief time, which leads to automatic cancellation of the frictionally locking connection being made possible, without a further action from the outside until the other switching state is reached or until the frictionally locking connection is completely released.

In a manner which is dependent on the configuration of the guide surface and the countersurface, it is possible that the frictionally locking connection can be reinforced in a manner which is dependent on the rotary or rotational direction of the inner and/or the outer friction surface element. Conversely, in the case of a corresponding configuration of the guide surface and the countersurface, weakening or canceling of the frictionally locking connection is possible in a manner which is dependent on the rotational direction.

A rotational movement of the inner friction surface element relative to the transmission element fundamentally takes place in relation to the rotational axis only in a manner which is coupled to or superimposed with the axial displacement movement of the inner friction surface element. The two movements are necessarily superimposed. If the inner friction surface element and the transmission element both rotate at the same rotational speed, no axial relative movement takes place between the inner friction surface element and the transmission element.

The axial displacement movement of the inner friction surface element, which axial displacement movement is determined by the bearing contact, means an axial movement relative to the transmission element, that is to say away from or toward the transmission element, and therefore an axial movement of the inner friction surface element or its friction surface toward or away from the friction surface of the outer friction surface element.

The transmission element can be connected fixedly to a rotatable rotor so as to rotate with it. The transmission element is received on the rotor such that it is fixed axially or can be moved slightly. The rotor can be, for example, a drive shaft or is preferably an output shaft. In the latter case, the output shaft is the element to be driven and is set in motion by the driven element or the outer friction surface element by way of the friction surface clutch.

Moreover, it is advantageous that the friction surface clutch is configured as a double cone clutch with two conical friction surface pairs with in each case an inner friction surface element and an outer friction surface element. One preferred refinement provides that each friction surface pair has an inner cone as an inner friction surface element and an outer cone as an outer friction surface element, the friction surface clutch accordingly comprising two double cones. The double cones are preferably of symmetrical design with respect to one another, whereby a plane which is axial with respect to the rotational axis forms a plane of symmetry. In this way, the two inner friction surface elements are identical and the two outer friction surface element are identical in an advantageous manner in terms of the manufacturing technology. The transmission element is positioned in the plane of symmetry.

Accordingly, it is advantageous that the transmission element is present axially between the inner friction surface elements.

A double cone clutch which advantageously has an increased friction area or, for example, a friction area which is twice as great in comparison with a single cone clutch can therefore be provided in a particularly compact manner.

By way of the present invention, an active torque is advantageously used, in order, in the case of a driven outer friction surface element, to displace the inner friction surface element, which is driven by the outer friction surface element in the first frictional contact in its rotational direction, axially in a predefined direction by way of the associated relative rotational movement with respect to the transmission element in a manner which is superimposed with a movement which is guided in a defined manner or can be predefined. This takes place in accordance with the bearing contact between the guide surface and the countersurface, the at least two friction surfaces being pressed onto one another to a more pronounced extent in a manner which is dependent on the extent or on the progression of the circumferential and axial displacement. As a result, the strength of the frictionally locking connection is increased in a self-boosting manner by way of higher pressing forces. This in turn makes it possible to transmit a higher torque compared with the transmission of torque in the case of the first friction contact between the inner friction surface and the outer friction surface of the friction surface pair.

In one refinement of the friction surface clutch according to the present invention as a double cone clutch with two friction surface pairs with in each case an inner friction surface on the inner friction surface element and an associated outer friction surface on the outer friction surface element, the two inner friction surface elements or the two inner cones are pressed apart from one another identically and simultaneously and are moved axially away from the transmission element by way of the torque which acts. The angle of inclination of the friction surfaces in relation to the rotational axis between the inner and the outer friction surface elements is identical, but is oriented on the first friction surface pair in an opposed manner with respect to the second friction surface pair. Accordingly, the two friction surfaces taper between the first inner and the first outer friction surface element in the axial direction away from the transmission element in an identical manner to the way in which the two friction surfaces taper between the second inner and the second outer friction surface element in the axial direction away from the transmission element.

In the case of the double cone friction surface clutch, if the two outer friction surface elements are the driven element, starting from the switched or non-coupled friction surface clutch with an air gap between the two friction surfaces of the two friction surface pairs, the inner friction surface elements are displaced axially in order to close the clutch by way of a triggering or switching force, such as a spring force which acts on the inner friction surface elements. The two inner friction surface elements being pressed apart from one another necessitates a reinforcement of the pressing force of the respective inner friction surface element onto the respective associated outer friction surface element as described above.

Initially, during the friction contact, a comparatively low torque is transmitted from the outer friction surface elements to the inner friction surface elements which in turn transmit a torque via the bearing contact to the transmission element. As a result, a transmission of torque takes place via the guide surface and the countersurface from the inner friction surface element to the transmission element, which necessarily leads to a continuation of the axial displacement movement, initiated by the triggering force, of the inner friction surface element toward a stronger frictionally locking connection.

By way of the increase of the transmitted torque, the axially acting force is in turn increased, which reinforces the frictionally locking connection.

An adapted or smooth transition can advantageously be achieved between the state of the stationary non-rotating element to be driven and the state of the element to be driven, in which it is driven with a maximum torque. Moreover, a continuous reinforcement of the transmission of torque from the driving element to the element to be driven takes place until the end of the switching operation.

One advantage of the present invention also lies in the fact that a compact double cone clutch is provided.

A further advantage of the friction surface clutch according to the present invention lies in the fact that a comparatively considerably lower switching force for canceling the frictionally locking connection is necessary in comparison with known comparative friction surface clutches. Here, a reduction of the switching force in comparison with previously necessary switching forces of over from approximately 50% to approximately 70% can be achieved.

Moreover, previously necessary comparatively large and heavy cup springs can be replaced by, for example, comparatively weaker smaller helical springs.

In addition, it is also advantageous in the case of the friction surface clutch according to the present invention that a larger or additional amount of installation space is not necessary in comparison with known comparative friction surface clutches. The friction surface clutch according to the present invention can therefore be installed instead of known friction surface clutches or can be used as a replacement clutch.

A switching apparatus can be used for switching the friction surface clutch according to the present invention, which switching apparatus comprises, for example, a piston unit with a piston which can be moved in a driven manner.

The piston which can be moved, for example, by way of a pressurized liquid or gaseous medium acts on the inner friction surface element in order to switch the clutch in the axial direction, in order to move the inner friction surface element axially relative to the outer friction surface element by a comparatively very small distance, for example in the millimeter range, and to release the frictionally locking connection. Here, the inner friction surface element is pressed in the direction of the transmission element.

Here, the transmitted torque between the clutch elements or the inner and the outer friction surface element is advantageously reduced somewhat, until the transmitted torque is lower than the transmitted torque which holds the friction surface pairs in a frictional connection, with the result that the friction surface pairs then slip with respect to one another. From the slip time, only the axially acting force still has to be overcome, which force acts from outside and/or mechanically on the inner friction surface element. The axial force is provided, for example, by way of at least one spring, for example compression springs which are available by default.

In this way, the self-locking boosting of the friction surface clutch is already interrupted after a comparatively small axial travel of the return displacement of the inner friction surface element, which leads directly to the cancellation of the frictionally locking connection. This means that only a comparatively low force has to be applied by way of the piston, a short switching time being possible, moreover, for example within a fraction of a second. The clutch is already open or released at the beginning of the axial restoring travel of the inner friction surface element or immediately following it, and the element to be driven, for example the output shaft, no longer experiences a drive torque from the transmission element and can be stopped immediately.

The axial restoring of the inner friction surface element takes place in a guided manner along the guide surface and countersurface and reversibly with respect to the relative movement which the inner friction surface element performs with respect to the transmission element during the reinforcing of the frictionally locking connection.

The transmission element is preferably enclosed by the two inner friction surface elements in the assembled state of the double cone clutch. For this purpose, each of the two inner friction surface elements has a receiving region with the guide surface, such as a depression which is dependent on the axial component width and in which one side of the transmission element finds its place in a manner so as to be received in a fitting manner. The transmission element has in each case the countersurface on axially opposite sides. This means that the transmission element is in contact by way of a first countersurface on a first axial side with the associated guide surface of the first inner friction surface element, and is in contact by way of a second countersurface on a second axial side with the associated guide surface of the second inner friction surface element.

The first and the second countersurface are preferably formed in each case by way of a plurality of part countersurfaces which are present spaced apart circumferentially from one another on the respective axial side of the transmission element.

Accordingly, the first and the second inner friction surface element in each case preferably have, on an inner side, a plurality of part guide surfaces which are present spaced apart circumferentially from one another on the inner side.

The guide surface and the countersurface or the part guide surfaces and part countersurfaces are preferably formed by way of obliquely slightly twisted surfaces, such as wedge angle surfaces or thread surfaces, which are configured between axially offset planar surfaces of the respective component, that is to say on the two sides of the transmission element or on the inner side of the two inner friction surface elements.

The oblique twisted wedge angle surfaces form, for example, ramp-like side flanks on an axially projecting pedestal which is ring segment-shaped in plan view and is present on the two sides of the transmission element or in the counterform on the inner side of the two inner friction surface elements.

There are preferably four axially projecting pedestals which are offset circumferentially by 90 angle degrees on the respective inner side of the two inner friction surface elements. Each pedestal extends circumferentially over, for example, approximately 30 angle degrees. A ramp-like side flank is configured in each case on each pedestal on both sides in the circumferential direction. This results in eight part guide surfaces on the inner side of an inner friction surface element.

Accordingly, there are four pedestals with in each case two ramp-like side flanks on each of the two sides of the transmission element which lie opposite one another, with the result that eight part countersurfaces exist on each side of the transmission element. On account of a present low radial play, only in each case four surface pairs are in contact during the torque transmission depending on the rotational direction. In the assembled state of the friction surface clutch, the bearing contact between the transmission element and the two inner friction surface elements therefore results via a total of eight part countersurfaces on the transmission element and eight part guide surfaces or in each case four part guide surfaces on the two inner friction surface elements.

There is a depression in the counterform between two pedestals which are spaced apart in the circumferential direction; the pedestals and the depressions are present circumferentially in an alternating manner.

The transmission element and the inner friction surface element advantageously have elevations or pedestals and depressions which are adapted to one another in the axial direction with respect to the rotational axis of the friction surface clutch, with the result that, in the assembled state, an elevation on one of the two components engages into a depression on the other component in a fitting manner, and vice versa. In the case of a transmission element and two inner friction surface elements which are present axially adjacently on both sides, a structure of this type which engages into one another in a fitting manner is configured on the two axially opposite sides of the transmission element and on the respective inner sides of the two inner friction surface elements.

The depressions and the pedestals with the part countersurfaces on the transmission element and the pedestals with the part countersurfaces on the inner side of the relevant friction surface element are adapted to one another in a fitting manner. A projecting pedestal on the transmission element reaches in the axial direction in a projecting manner into a depressed intermediate space on the inner side of the friction surface element, the intermediate space resulting between two adjacent pedestals on the inner side of the friction surface element. An intermediate space on the transmission element corresponds at least substantially to the shape and dimensions of the pedestal with a part guide surface on the friction surface element and vice versa, that is to say an intermediate space on the transmission element corresponds at least substantially to the shape and dimensions of the pedestal with a part guide surface.

This structure which engages into one another on both sides of the transmission element with the inner friction surface elements forms a type of spline system in the axial direction with a sliding mechanism function. In the case of a position of the two friction surface elements on the transmission element, in which position they are pushed together in the axial direction, that is to say in the case of a friction surface clutch which is switched from the outside, it is preferably such that the end side of a pedestal abuts or bears flatly against the bottom of the intermediate space between two adjacent pedestals of the respective element which lies axially opposite.

All the pedestals and all the intermediate spaces on the transmission element are preferably identical to one another.

All the pedestals and all the intermediate spaces on the inner sides of the friction surface elements are preferably likewise of identical design to one another. In this way, it is also possible for the two friction surface elements to be of identical design, which is advantageous with regard, in particular, to the manufacture of the friction surface elements and the assembly of the friction surface clutch. In this way, a friction surface element can be selectively mounted on the right or on the left of the transmission element.

The number of pedestals on the transmission element and the number of pedestals on the inner side of the inner friction surface element, and therefore the number of depressions, can also be greater than or less than four; there are preferably at least two pedestals, for example three pedestals, and three depressions on an inner side of the at least one inner friction surface element and on one side or both sides of the transmission element.

A further advantageous refinement of the present invention is distinguished by the fact that at least one spring is active between the transmission element and the inner friction surface element.

By way of the spring, a force for acting on or for actuating the inner friction surface element is preferably applied in a manner which is permanently automatic and uncomplicated. The force direction of the spring is automatically active in the direction of setting up or reinforcing of the frictionally locking connection. In order to release the frictionally locking connection, an action is performed from the outside in a switchable manner, for example, by way of piston means which can be actuated in a controlled manner and act on the inner friction surface element counter to the spring force.

In the case of a double cone clutch, the spring is advantageously present between the transmission element and the two inner friction surface elements. In this way, the two inner friction surface elements are prestressed via the spring, in particular are prestressed identically in the direction of reinforcing of the frictionally locking connection between the two inner friction surface elements and the two associated outer friction surface elements.

The spring advantageously comprises precisely one spring member or in practice a plurality of spring members which are, for example, identical and together provide a symmetrical action of force on the at least one inner friction surface element or act in a symmetrical and identical manner on the two inner friction surface elements in the case of a double cone clutch.

The provision of force or pressure by way of the springs preferably takes place permanently by way of springs which are, in particular, mechanical, such as helical springs or the like. In particular, the springs provide a prestress on the one friction surface element or the two inner friction surface elements in the basic state. It is particularly advantageous here that, for example, a compression spring acts both on the first inner friction surface element and the second inner friction surface element. Here, for example, the compression or helical spring acts with one spring end on the first inner friction surface element and with another opposite spring end on the second inner friction surface element.

The springs are preferably formed by way of compression springs. The compression springs press the at least one inner friction surface element against the at least one outer friction surface element, in particular, in an automatic manner. In this way, in the case of a switchable friction surface clutch, in the basic state of the friction surface clutch, that is to say when no action or switching is carried out from the outside on the friction surface clutch, a transmission of torque is set up reliably from the driven element to the element to be driven. In this way, in the basic state, a safety function with a transmission of torque can be provided, for example.

Finally, it is also advantageous that the springs pass through in the axial direction on the transmission element and come into contact on both sides of the transmission element with a respectively associated inner friction surface element. This arrangement is particularly space-saving, at least one passage opening or one hole being configured in the transmission element for the springs to pass through. It is also made possible, moreover, that the respective spring element acts on the two inner friction surface elements, which advantageously reduces the number of necessary spring elements.

In addition, the spring element is fixed or held in its position on the transmission element on account of passing through the transmission element. The passage opening which extends in the axial direction with respect to the rotational axis of the transmission element is advantageously present in a depression between two adjacent pedestals or in two or more of the plurality of depressions of the transmission element, preferably in every depression of the transmission element. Accordingly, for example, a blind bore is present for receiving and positioning the associated end of the springs in the inner friction surface elements. The blind bore is configured in that pedestal of the inner friction surface element which belongs to the depression which is provided with a passage opening.

Since, in relation to the rotational axis, a limited reversible relative rotation takes place between the transmission element and the friction surface element or the two friction surface elements during reinforcing or the operation which is reversible in relation thereto for canceling the frictionally locking connection, which takes place over a comparatively small angular degree range of preferably, for example, from 5 to 15 angle degrees between the transmission element and an inner friction surface element, the passage opening in the transmission element has a curved course in the circumferential direction or the passage opening is lengthened and extends over an approximately double angular degree range of, for example, from 10 to 30 angle degrees, in order that the springs which are flexible in the longitudinal direction thereof do not become jammed. The double angular degree range is owing to the opposite rotational direction of the first inner friction surface element with respect to the rotational direction of the second inner friction surface element, in relation to an axial displacement movement of the two transmission elements during switching of the friction surface clutch.

In accordance with one preferred variant of the friction surface clutch according to the present invention which is designed as a double cone clutch, a passage opening is configured in each of the depressions of the transmission element and a blind bore is configured in each pedestal of the two inner friction surface elements. In the case of preferably four pedestals and four depressions on each side of the transmission element and accordingly four pedestals and four depressions on each axial inner side of the two inner friction surface elements, there are accordingly four spring elements, in particular four compression helical springs.

Another advantageous refinement of the present invention lies in the fact that the guide surface on the inner friction surface element and the countersurface on the transmission element are configured in such a way that, starting from an axial stop position of the inner friction surface element in the direction of the transmission element, in the case of setting up the frictionally locking connection by way of the springs independently of the rotational direction of the outer friction surface element and therefore independently of the rotational direction of the inner friction surface element relative to the transmission element, the axial displacement movement of the inner friction surface element leads to a reinforcement of the frictionally locking connection between the inner friction surface element and the outer friction surface element.

In this way, starting from the friction surface clutch which is not actuated from the outside, advantageously independently of the rotational direction or the rotary direction of the driven element of the friction surface clutch, a drive action is set up from the driven element of the friction surface clutch to the element to be driven. This arrangement is advantageous, for example, in the case of applications, in which a drive is to take place of the element to be driven, regardless of whether the driven element rotates in the one rotational direction or in the other rotational direction.

It is also advantageous that the guide surface on the inner friction surface element and the countersurface on the transmission element are configured in such a way that, in a manner which is dependent on the rotational direction of the inner friction surface element about the rotational axis, the axial displacement movement of the inner friction surface element leads to setting up or to canceling of the frictionally locking connection between the inner friction surface element and the outer friction surface element.

The transition from the frictionally locking connection which is set up in the case of a transmission of a maximum possible torque, for example, at an identical rotational speed of the driven element and the element to be driven of the friction surface clutch, up to the complete cancellation of the frictionally locking connection can comprise a comparatively short phase, in which a smaller torque than the maximum possible torque can be transmitted, before slipping takes place between the friction partners or the at least two friction surfaces.

It is advantageous, moreover, that the guide surface on the inner friction surface element and the countersurface on the transmission element are configured in such a way that, in a manner which is dependent on the rotational direction of the inner friction surface element relative to the transmission element, the axial displacement movement of the inner friction surface element leads to a different reinforcement of the frictionally locking connection between the inner friction surface element and the outer friction surface element. This can be realized, in particular, by way of a correspondingly configured guide surface and countersurface, with the result that surface regions on the guide surface on the inner friction surface element and on the countersurface on the transmission element, which surface regions are oriented differently spatially and act in a manner which is dependent on the rotational direction of the inner friction surface element, come into contact with one another. This can be realized, for example, by way of different spatial angles of inclination of the relevant guide surface and countersurface and/or by way of a spatially planar and/or curved shape of the surface of the guide surface and the countersurface.

It is also advantageous if the guide surface on the inner friction surface element and the countersurface on the transmission element are configured in the manner of wedge angle surfaces. The interaction of the guide surface with the countersurface is preferably designed in the manner of a sliding mechanism such as a wedge mechanism. In particular, the wedge angle surfaces are designed in such a way that the strength of the frictionally locking connection can be reinforced independently of the rotational direction of the inner friction surface element about the rotational axis, that is to say the inner friction surface element is driven in a frictional connection by the outer friction surface element.

The guide surface and the countersurface represent, for example, mechanism surfaces of the wedge mechanism with spatially slightly twisted or bent wedge surfaces.

It is also advantageous that the guide surface on the inner friction surface element and the countersurface on the transmission element are configured in the manner of crossed wedge angle surfaces. The crossed wedge angle surfaces are preferably at a wedge angle of approximately from 40 to 50 angle degrees in relation to an axial plane which lies perpendicularly with respect to the rotational axis. There are preferably a plurality of wedge angle surfaces and part countersurfaces which are separate from one another on the transmission element. Two part countersurfaces are preferably set so as to run onto one another on an elevation or on a pedestal. The pedestal is therefore formed in the circumferential section, in particular, in the shape of a trapezoid with equal legs, the two legs being formed by way of the two part countersurfaces. The shorter parallel side of the trapezium lies axially on the outside on the transmission element.

In accordance with one advantageous modification of the present invention, the guide surface on the inner friction surface element and the countersurface on the transmission element are configured in the manner of mechanism surfaces, for example, of a screw mechanism or a gate-type mechanism or a ball ramp mechanism.

The guide surface on the inner friction surface element and the countersurface on the transmission element are advantageously configured in the manner of a screw thread.

A frictionally locking connection of the two conical friction surface pairs can advantageously be released by way of a one-sided force actuation. In the case of a double cone clutch, the transmission element can be displaced axially slightly with respect to the rotor which is connected fixedly to the transmission element so as to rotate with it, such as the output rotor. In this way, via the action from the outside on the one inner friction surface element, the latter can be displaced axially with a slight rotation with respect to the transmission element, whereby the one inner friction surface element is moved out of the frictionally locking connection to the associated outer friction surface element. Here, the transmission element is also displaced axially with respect to the rotor. The interaction of the guide surface and the countersurface on the other inner friction surface element and the transmission element and stops bring it about that an axial displacement also of the other inner friction surface element which is not loaded directly by the piston takes place in the direction of the transmission element. Here, the piston-loaded inner friction surface element is first of all released from the frictionally locking connection to the associated outer friction surface element. As soon as the piston-loaded inner friction surface element reaches an outer annular stop between the two outer friction surface elements as a result of the axial displacement movement, the inner friction surface element presses against the annular stop and therefore displaces the two outer friction surface elements in such a way that the other inner friction surface element therefore also passes out of the frictionally locking connection to the associated outer friction surface element. To this end, the other inner friction surface element lies against an axially fixed stop which is provided for this purpose.

Accordingly, the transmission element has a slight axial displaceability on the associated rotor. As a result, the frictionally locking connection between the two inner friction surface element and the associated outer friction surface element is weakened or canceled. The double cone clutch is open and a transmission of torque is canceled or interrupted.

In the case of a single cone clutch, it is advantageous that the transmission element is fixed axially on the associated rotor or, for example, on the output shaft.

The friction surface clutch according to the present invention can advantageously be used, for example, for switching ancillary units on and off, in particular, in the case of motor vehicles with internal combustion engines.

There is advantageously a mechanical stop which acts in the axial direction with respect to the rotational axis and with which the inner friction surface element comes into contact.

In the case of a double cone clutch, there is a first mechanical stop for the first inner friction surface element which can be displaced axially from the outside in order to cancel the frictionally locking connection, for example, by way of a piston. The first mechanical stop is connected fixedly to the two outer friction surface elements. As soon as the first inner friction surface element reaches the first stop, the two outer friction surface elements are likewise displaced axially somewhat under the further piston movement. In this way, the other or second inner friction surface element is also released from the associated outer friction surface element, with the result that the two friction surface pairs are out of friction contact.

In order that the second inner friction surface element is not also displaced via the transmission element, there is a further mechanical stop for the second inner friction surface element.

In the case of a double cone clutch, the first stop can be configured as a circumferential annular disk which is fixed axially between the two outer friction surface elements. The second stop can be, for example, an axially fixed disk which is present on a side of the second inner friction surface element, which side faces away from the transmission element.

The clutch can be released, for example, by way of a hydraulically, pneumatically or electrically driven piston.

The present invention also extends to an ancillary unit of a motor vehicle such as an air compressor or a hydraulic pump, there being a friction surface clutch according to the present invention which is configured as above and via which the ancillary unit can be connected to a drive. The ancillary unit has, in particular, an output shaft which can be driven by means of the element to be driven or a drive shaft which rotates with the aid of an internal combustion engine or electric motor of the motor vehicle.

BRIEF DESCRIPTION OF THE DRAWINGS

Further features and advantages of the present invention are described in greater detail using different diagrammatically illustrated exemplary embodiments of arrangements according to the present invention.

DETAILED DESCRIPTION OF THE INVENTION

Figure 1:
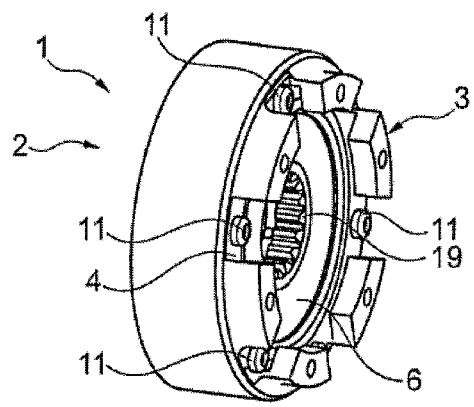
FIG. 1 shows a perspective view of a friction surface clutch according to the present invention which is configured as a double cone clutch.
Figure 2:
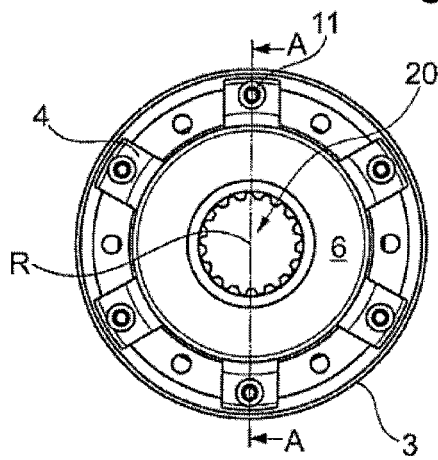
FIG. 2 shows a plan view of the friction surface clutch in accordance with FIG. 1.

FIG. 1 shows a structural unit having a friction switching clutch 1 according to the present invention which is configured as a double cone clutch 2.

In the following text, reference is made to a central axis of symmetry or rotation R, about which elements of the friction switching clutch 1 rotate in the drive state, with the result that axial or an axial direction means a direction parallel to the rotational axis R and radial or radial direction means a direction transversely with respect to the rotational axis in the following text. If circumferential is used, this likewise relates to the rotational axis R if nothing else is stated.

Behind one another in the axial direction, the double cone clutch 2 comprises a cone driver 3, a first outer friction surface element or a first outer cone 4, a first inner friction surface element or a first inner cone 6 with a friction lining 6a, a transmission element or a center part 10 with four identical compression springs 9 which pass through it, a release plate 8, a second inner friction surface element or a second inner cone 7 with a friction lining 7a, a second outer friction surface element or a second outer cone 5, and six screws 11. The elements 4 to 12 which are arranged in a correct position with respect to one another are assembled from one side by way of the screws 11 which engage through axial bores in the outer cone 4 and the release plate 8, which axial bores are distributed so as to be circumferentially spaced apart uniformly, and are screwed into internal threaded bores 12 of the outer cone 5. The cone driver 3 and the two outer cones 4, 5 and the release plate 11 which is clamped in between are connected fixedly to one another so as to rotate together, and rotate jointly about the rotational axis R. The outer cones 4, 5 and the release plate 8 can be displaced slightly axially relative to the cone driver 3.

The center part 10 can be moved slightly over a travel which is predefined in a limited manner along the rotational axis or axially, and can be rotated about the rotational axis R together with the inner cones 6, 7.

The two inner cones 6 and 7 are identical components. The two outer cones 4 and 5 can likewise be identical, but are possibly different in terms of the type of the passage holes for the screws 11. The passage holes and the outer cone 4 do not have an internal thread.

The cone driver 3 is set in rotation about the rotational axis R via a drive (not shown), such as a drive rotor of a motor vehicle. In the case of a double cone clutch 2 which is not switched, an element to be driven (not shown) which is connected fixedly to the center part 10 so as to rotate with it, or an output rotor or an output shaft which is concentric with respect to R is correspondingly set in rotation, in order, for example, to drive an ancillary unit of the motor vehicle by way of the output shaft. In the case of a switched or released double cone clutch 2, a force F3 being applied actively from the outside by way of the switching operation axially on the inner friction surface element 7 (see FIG. 3), the cone driver 3 rotates jointly with the outer cones 4, 5 and the release plate 8, without a torque being transmitted to the inner cones 6, 7 and the center part 10 by way of the output shaft.

For the transmission of torque from the cone driver 3 to the outer cone 4, a spline structure which engages into one another is provided between the radially outer circumferentially running outer side of the outer cone 4 and a circumferentially configured radially inner side of the cone driver 3.

Figure 9:
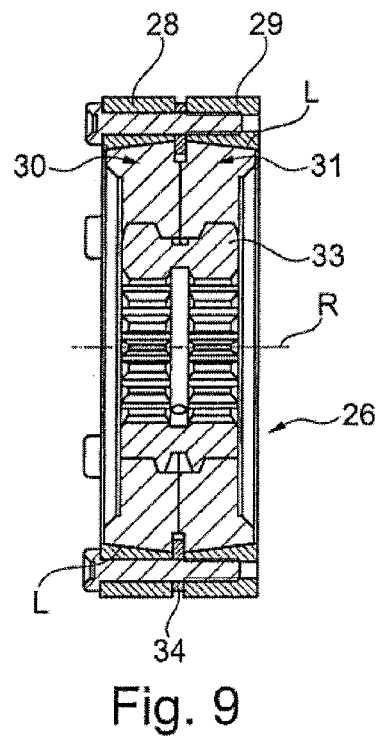
FIG. 9 shows the open friction surface clutch in accordance with FIG. 7 in section.

Depending on the axial position of the two inner cones 6, 7, they are either connected in a frictionally locking manner to the outer cones 4, 5 in the case of a double cone clutch 2 which is not switched (see, for example, FIG. 11), or they are separated from the outer cones 4, 5 via an air gap in the case of an open or switched double cone clutch 2, which is shown by FIG. 9, for example.

For the transmission of torque to the output shaft in the case of a double cone clutch 2 which is not switched, a frictionally locking connection is set up by way of a frictional connection between the friction lining 6a in the circumferential friction surface 4a radially on the inside on the outer cone 4 and between the friction lining 7a and a circumferential friction surface 5a radially on the inside on the outer cone 5.

In the switched state of the double cone clutch 2, the frictionally locking connection is canceled, by the circumferential air gap between the friction lining 6a and the friction surface 4a and a circumferential air gap L between the friction lining 7a and the friction surface 5a existing.

Starting from the double cone clutch 2 which is not switched from the outside, without an air gap, therefore if there is a "clutch closed" state, no force acting from the outside on the inner cones 6, 7, which force presses them in the direction of the center part 10, which will be described further below, the four compression springs 9 which are configured as helical springs come into action.

Each of the four compression springs 9 reaches in its longitudinal direction in each case axially through an associated passage bore or slot 13 in the center part 10. Each slot 13 has a contour which is curved circumferentially with respect to R. The two free ends of each compression spring 9 reach in each case into a suitably present blind bore 14 on inner sides of the two inner cones 6, 7. In this way, the compression springs 9 are positioned and held in a defined manner in the double cone clutch. In addition or as an alternative to the slots 13, passage holes can be present in the center part 10 in the axial direction through four pedestals 24 for leading through the compression springs 9 or further compression springs.

The compression springs 9 are adapted in such a way that each of them, in an individually prestressed manner, exerts a pressure force F1 on the inner cone 6 and a pressure force F2 which is identical to the pressure force F1 on the inner cone 7, and press the inner cones 6, 7 axially apart from one another or press them away from the center part 10 in the direction of the respective outer cones 4, 5. Here, the air gap L between the two conical friction surface pairs 6a, 4a and 7a, 5a is reduced or closed. Here, the annular cone-shaped friction lining 6a comes into frictional contact with the annular cone-shaped friction surface 4a of matched design. At the same time, the annular cone-shaped friction lining 7a likewise comes into frictional contact with the annular cone-shaped friction surface 5a of matched design.

The displacement of the inner cones 6, 7 on account of the action of the compression springs 9 takes place in a defined and/or guided manner in bearing contact with the center part 10. Accordingly, the two inner cones 6, 7 are in bearing contact by way of their inner side with the respective side of the center part 10. The bearing contact is realized on the one side of the center part 10 via a multiple-piece guide surface 15 on the inner cone 6 and a multiple-piece countersurface 16 on the center part 10, and is realized on the other side of the center part 10 via a multiple-piece guide surface 17 on the inner cone 7 with a multiple-piece countersurface 18 on the center part 10 (see FIGS. 4-6).

The centering action between the inner cone 6 and the center part 10 and the centering action between the inner cone 7 and the center part 10 take place via narrow outer circumferential cylinder surfaces 10a, which are concentric in each case with respect to the rotational axis R, on opposite journal sections on both sides on the center part 10. The cylinder surfaces 10a are in sliding contact with in each case one concentric inner circumferential bore surface 6b on the inner cone 6 and one concentric inner circumferential bore surface 7b on the inner cone 7.

The guide surfaces 15, 17 and countersurfaces 16, 18 which are formed as wedge angle surfaces or sliding surfaces make a guided relative movement possible between the respective inner cone 6, 7 and the center part 10. Here, positive guidance is predefined, a relative rotational movement between the center part 10 and the inner cone 6, 7 being superimposed with a relative axial movement between the center part 10 and the inner cone 6, 7, or causing one another inversely.

As the frictional contact begins between the friction lining 6a and the friction surface 4a and simultaneously between the friction lining 7a and the friction surface 5a, a transmission of torque begins from the identically jointly rotating outer cones 4, 5 to the inner cones 6, 7. The two inner cones 6, 7 for their part transmit a torque to the center part 10 via the bearing contact. Here, the guide surfaces 15, 17 and the countersurfaces 16, 18 are matched in such a way that an axial movement of the two inner cones 6, 7 away from the center part 10 toward the respective outer cones 4, 5 necessarily takes place with a relative rotational movement of the inner cone 6, 7 with respect to the center part 10. As a result, this leads to automatic reinforcing of the frictionally locking connection of the inner cone 6 to the outer cone 4 and of the inner cone 7 to the outer cone 5. Via the wedge angle surfaces or guide surfaces 15, 17 and countersurfaces 16, 18, an axial force is provided in addition to the spring force of the compression springs 9, which additional axial force acts in the same direction as the pressure force of the compression springs 9, that is to say in a reinforcing manner as far as the frictionally locking connection is concerned. The relative rotational movement and the relative axial movement between the respective inner cone 6, 7 and the center part 10 takes place in a matched manner and is limited via stops on the components and/or via the wedging effect of the conical friction surfaces 6a and 4a and 7a and 5a, which wedging effect blocks in the axial direction away from the center part 10.

In the case of a closed double cone clutch 2, the center part 10 is driven by the two inner cones 6, 7 at the same rotational speed via the bearing contact of the guide surfaces 16, 18 and the countersurfaces 15, 17, and the output shaft which is connected fixedly to the center part 10 so as to rotate with it is therefore driven rotationally about the rotational axis R.

In order to cancel the drive of the output shaft in the case of a cone driver 3 including outer cones 4, 5 which is rotating in a driven manner, the transmission of torque is interrupted by the frictionally locking connection between the outer cones 4, 5 and the inner cones 6, 7 being released. This again results in the air gap L and the axially outwardly displaced inner cones 6, 7 have to be displaced axially inward closer toward the center part 10, with simultaneous compression of the compression springs 9 and a rotational relative movement. The restoring action takes place in a reversed manner with respect to the setting up of the frictional connection in a manner which is guided in accordance with the sliding or bearing contact of the guide surfaces 16, 18 and the countersurfaces 15, 17.

Figure 3:
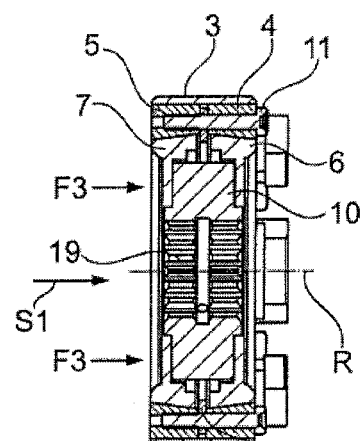
FIG. 3 shows a sectional view of the friction surface clutch in accordance with line A-A in FIG. 2 in the case of a frictionally locking connection which is set up.

The release of the double cone clutch 2 or the components 6 and 4 and 7 and 5 which are connected in a frictionally locking manner takes place by way of the application of the axially acting force F3 (see FIG. 3) on an axial surface outer side by one of the two inner cones 6 or 7. The inner cone which is not loaded with force is supported axially on a stop here. FIG. 3 shows the closed double cone clutch 2 before the force F3 acts. There is no air gap between the friction surfaces, and the two inner cones 6, 7 are spaced apart axially slightly from the release plate 8. The application of force can take place by way of a piston (not shown) which can be moved to and fro axially in a hydraulically, pneumatically or electromotively controlled manner. Here, furthermore, the inner cone 7 which is loaded with force from the outside in the exemplary embodiment which is shown in accordance with FIG. 3 is displaced axially in the direction S1 and comes into contact with the radially inwardly projecting release plate 8. During the further displacement of the inner cone 7 by way of the force F3, the two outer cones 4, 5 are moved with the release plate 8 in the direction S1. Since the other inner cone 6 lies axially against a stop (not shown) and cannot be moved in the direction S1, the frictionally locking connection between the outer cone 4 and the inner cone 6 is also canceled with the movement of the two outer cones 4, 5 in the direction S1. The double cone clutch 2 is open, and no rotary drive takes place from the outer cones 4, 5 to the inner cones 6, 7. By way of the axial displacement which is imposed from the outside, the two inner cones 6, 7 are rotated somewhat with respect to the rotational axis R in a simultaneous and/or superimposed manner and in a manner which is predefined by way of the wedge angle surfaces 15 to 18, whereby the release of the frictionally locking connection is assisted. The force F3 then has to merely act counter to or overcome the spring force of the compression springs 9.

By way of the force on one of the inner cones 6, 7, which force acts axially from the outside, a force component is received in the axial direction on the rotating center part 10, with the result that the center part 10 is displaced slightly axially toward the other inner cone via a spline system 19 on the inside of a shaft receptacle 20, whereby the other inner cone is positively displaced likewise axially toward the center part 10 via the guide surface and countersurface, counter to the force of the compression springs 9.

As a result, the frictional connection of the two inner cones 6, 7 to the associated outer cone 4, 5 is canceled.

The center part 10 has a central opening which provides the shaft receptacle 20 for the output shaft to reach through, the center part 10 being connected fixedly to the output shaft so as to rotate with it.

The axial displacement of the two inner cones 6, 7 toward the center part 10 is limited by way of a mechanical stop or by way of the axially positionally fixed release plate 8 which acts on the two inner cones 6, 7 on their side which is directed toward the center part 10, on the edge which lies radially on the outside.

Figure 4:
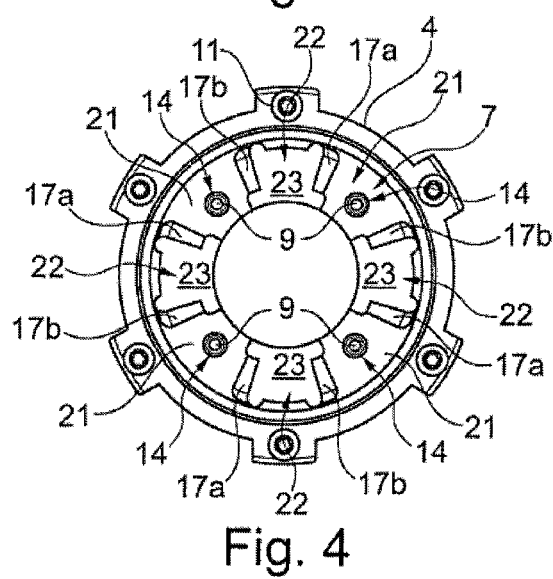
FIG. 4 shows the friction surface clutch in accordance with FIG. 1 without a front inner cone and without a center part.
Figure 6:
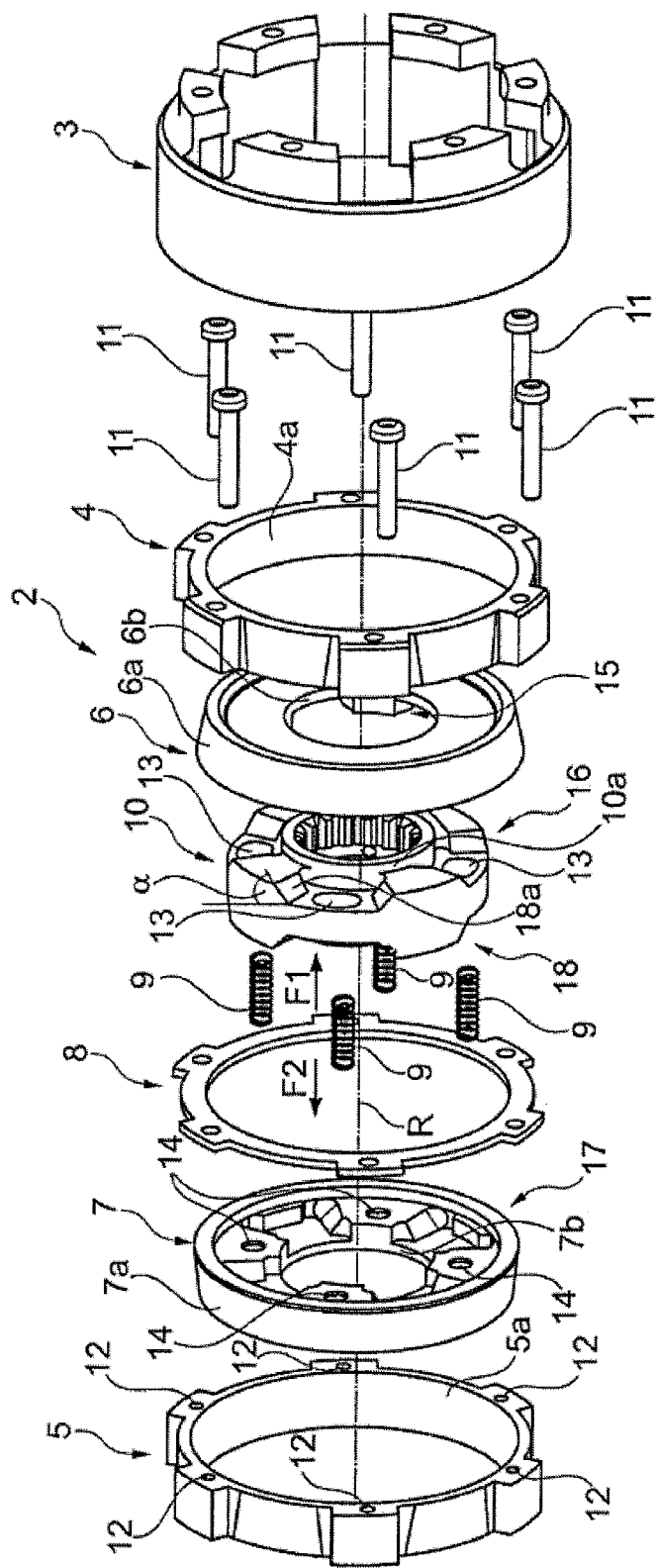
FIG. 6 shows the friction surface clutch in accordance with FIG. 1 in an exploded illustration.

As can be seen, in particular, from FIG. 4 and FIG. 6, the guide surface 17 on the inner cone 7 is formed from eight part guide surfaces 17a, 17b, in each case two part guide surfaces 17a, 17b being present on a common, axially planar pedestal 21 with a circularly annular segment-shaped elevation. The four pedestals therefore have a total of eight part guide surfaces 17a, 17b which in each case adjoin opposite edges of the elevation.

The part guide surfaces 17a, 17b reach as far as planar base areas 23 of depressions 22 which are configured in each case circumferentially between two adjacent pedestals 21.

Figure 5:
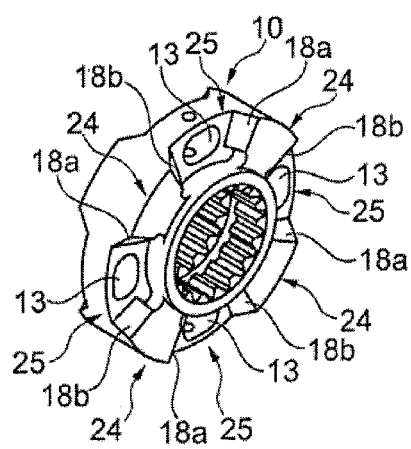
FIG. 5 shows a perspective illustrated center part of the friction surface clutch in accordance with FIG. 1.

The two sides of the center part 10 which lie axially opposite one another are configured as a fitting counterform with respect to the pedestals 21 and the depressions 22, with four pedestals 24 and four depressions 25 (see FIG. 5). The four pedestals 24 in each case have two part countersurfaces 18a, 18b, whereby eight part countersurfaces 18a, 18b form the countersurface 18. Each part countersurface 18a is in bearing contact with a part guide surface 17a, and each part countersurface 18b is in bearing contact with a part guide surface 17b. The countersurface 16 has corresponding part countersurfaces 18a, 18b.

The wedge angle surfaces or the part guide surfaces 17a, 17b and the part countersurfaces 18a, 18b have a wedge angle α of approximately 50 angle degrees (see FIG. 6).

A slot 13 passes through the bottom of each depression 25.

This results in an axially acting spline system with a radial and axial relative movability between the two respective sides of the center part 10 and the inner cones 6, 7.

The double cone clutch 2 is of matched design with respect to the guide surfaces 15, 17 and the countersurfaces 16, 18 such that, independently of the rotational direction of the outer cones 4, 5 about the rotational axis R, in relation to an assumed fixed rotational position about the rotational axis R of the center part 10, the axial pressing force of the compression springs 9 in the case of an open friction surface clutch, that is to say inner cones 6, 7 which are moved axially up to the center part 10, the two inner cones 6, 7 rotate in the opposite direction about R and are both moved axially to the outside or away from the center part 10. The effect which is reinforced by way of the wedge angle surfaces or guide surfaces 15, 17 and countersurfaces 16, 18 leads to automatic setting up of the maximum frictionally locking connection of the inner cones 6, 7 to the outer cones 4, 5.

During the release of the double cone clutch 2 with the axial counterforce F3 from the outside, counter to the pressing force of the compression springs 9, the two inner cones 6, 7 are displaced back axially toward the center part 10 and in the process are rotated back in the mutually opposed direction about R, with the result that the frictional connection of the two inner cones 6, 7 to the outer cones 4, 5 is canceled simultaneously.

In the case of the double cone clutch 2, as described above, the guide surfaces 15, 17 and the countersurfaces 16, 18 are of identical design in the two rotational directions.

FIGS. 7 to 11 show a further embodiment of a friction switching clutch according to the present invention which is configured as a double cone clutch 26.

In the case of the double cone clutch 26, the guide surfaces and countersurfaces are of different configuration in a main rotational direction of the driven element and in an opposite rotational direction which is opposed with respect to the main rotational direction. As a result, a different action can be achieved in a manner which is dependent on the rotational direction of the driven element about the rotational axis R, which relates to the clutch state. The principle of the self-reinforcing effect during the interaction of the guide surfaces and the countersurfaces is likewise met in the case of the double cone clutch 26.

In the case of the double cone clutch 26, a freewheel is realized in one rotational direction of the driven element, whereby no transmission of torque takes place from the driven element to the element to be driven. In the other rotational direction of the driven element or the main rotational direction, a transmission of force takes place by way of a frictional connection between conical friction surfaces.

Figure 7:
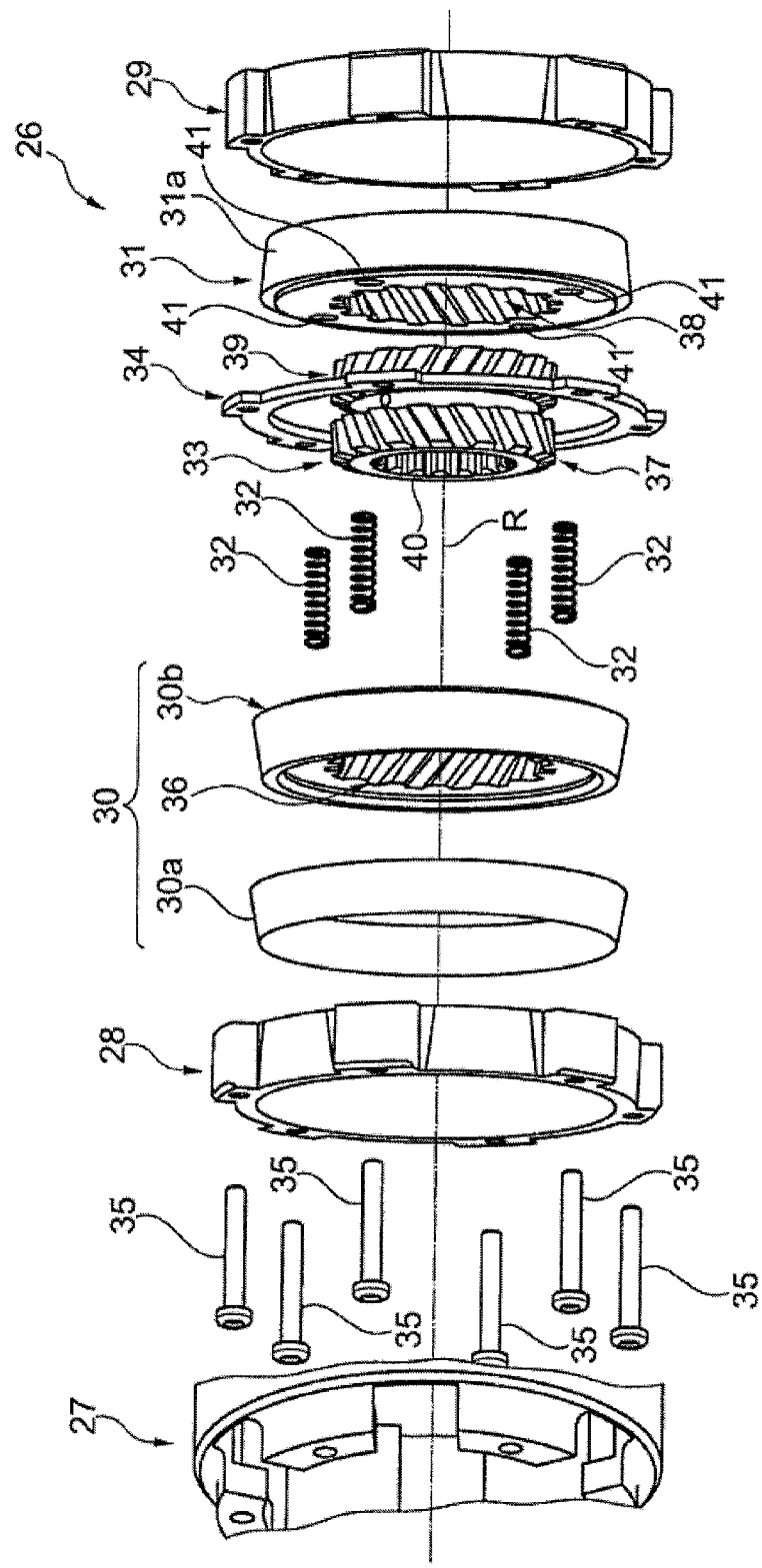
FIG. 7 shows an exploded illustration of a further embodiment of a friction surface clutch according to the present invention which is configured as a double cone clutch.

In addition to a cone driver 27, details of which are shown in FIG. 7, the double cone clutch 26 comprises two outer cones 28, 29, two inner cones 30, 31 with in each case one clutch lining 30a, 31a, four compression springs 32 which are configured as helical springs, a center part 33, a release plate 34 and six screws 35, by means of which the double cone clutch 26 is assembled. The outer cone 28 is pushed into the axially fixed cone driver 27 and is connected fixedly to the latter so as to rotate with it by way of a positively locking connection. The outer cone 28 can be displaced axially to a small extent with respect to the cone driver 27.

The clutch linings 30a, 31a are fastened fixedly on the outside to a main body of the inner cones 30, 31 in an annular disk-shaped manner. With regard to the inner cone 30, the clutch lining 30a and a main body 30b are shown separately in FIG. 7 in order to illustrate them.

The center part 33 is provided in a central receiving opening with a spline contour 40 which is adapted in a fitting manner to a corresponding tooth contour of the output shaft (not shown), whereby the center part 33 can be connected fixedly to the output shaft so as to rotate with it.

The four compression springs 32 are received in a prestressed and loosely plugged-in manner in each case on both sides with their screw ends in opposite blind bores 41 on the inner sides of the inner cones 30, 31, and press the two inner cones 30, 31 axially to the outside, away from the center part 33.

In order to release or open the closed double cone clutch 26 and in order to interrupt the transmission of torque, the rotational direction of the cone driver 27 can be reversed. Force-actuated opening of the double cone clutch 26 is possible independently of the rotational direction, for example via a piston.

The interdependencies of the frictionally locking function of the double cone clutch 26 correspond to those of the frictional connection function of the double cone clutch 2 and will therefore not be described in greater detail.

The difference of the double cone clutch 26 from the double cone clutch 12 lies in the design of the wedge angle surfaces or the guide surfaces and countersurfaces on the inner cones 30, 31 and the center part 33.

In the case of the double cone clutch 26, there is a circumferentially configured guide surface 36 on the inner cone 30 at a central passage opening of the main body 30b, and there is an associated countersurface 37 on the center part 33, which countersurface 37 is configured radially on the outside and circumferentially on the one center part side. Moreover, there is a circumferentially configured guide surface 38 on the inner cone 31 at a central passage opening, and there is an associated countersurface 39 on the center part 33, which countersurface 39 is configured radially on the outside and circumferentially on the other center part side.

The guide surfaces 36, 38 and the countersurfaces 37, 39 are configured in the manner of a multiple-turn right-hand thread and a multiple-turn left-hand thread. Therefore, in the case of a rotation of the driven cone driver 27 or the outer cones 28, 29 in a first rotational direction, a transmission of torque takes place to the element to be driven or to the output shaft which is connected fixedly to the center part 33 so as to rotate with it, whereby the center part 33 or the output shaft is driven in a rotating manner in the first rotational direction.

In the case of a rotation of the driven cone driver 27 or the outer cones 28, 29 in the other or second rotational direction, no transmission of torque takes place to the element to be driven or to the center part 33 with the output shaft, with the result that the latter is not driven or is at a standstill, as a result of which an output-side freewheel function is set up.

In other words, the two inner cones 30, 31 are pushed in the first rotational direction of the outer cones 28, 29 axially to the outside into the frictionally locking connection, and the two inner cones 30, 31 are pushed in the second rotational direction of the outer cones 28, 29 to the inside toward the center part, whereby an air gap is set between the conical friction surfaces of the two friction surface pairs, that is to say there is no drive contact with respect to the output side or with respect to the center part 33 with the output shaft. A freewheel function prevails with a small radial play between the inner cones 30, 31 and the center part 33.

Figure 10:
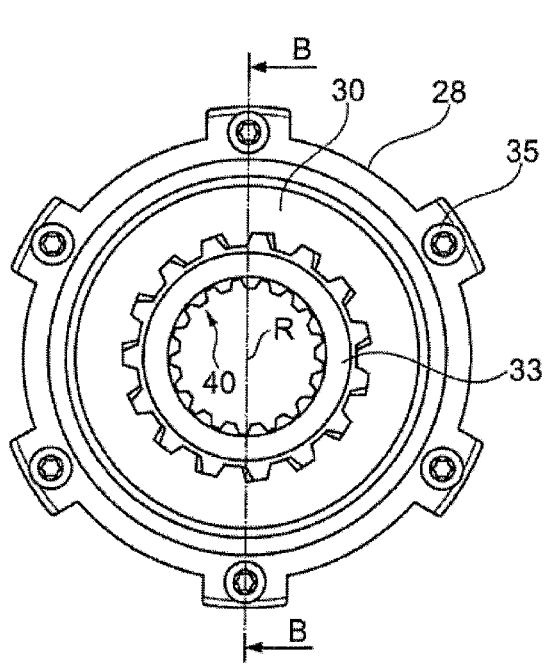
FIG. 10 shows the closed friction surface clutch in accordance with FIG. 7 in a plan view.

As illustrated, in particular, by FIG. 10 with the double cone clutch 26 without a cone driver 27 in plan view, a fixed connection between the inner cones 30, 31 and the center part 33 so as to rotate together is realized via the guide surfaces 36, 38 and the countersurfaces 37, 39 or their mutual bearing contact, which are configured on one side as a multiple-turn right-hand thread and on the other side as a multiple-turn left-hand thread.

Figure 8:
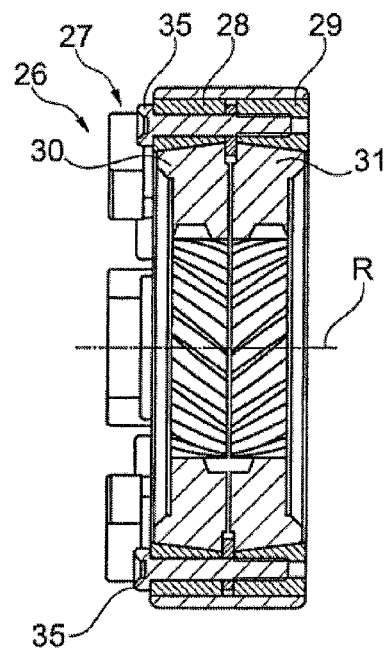
FIG. 8 shows the friction surface clutch in accordance with FIG. 7 in section with a driver without an inner part.

FIG. 8 shows the double cone clutch 26 in section with a cone driver 27 without a center part 33.

In FIG. 9, the double cone clutch 26 is open, with the result that a uniform circumferentially continuous air gap L is configured between the friction surfaces of the two friction surface pairs 30, 28 and 31, 29. The two inner cones 30, 31 lie axially against the release plate 34.

Figure 11:
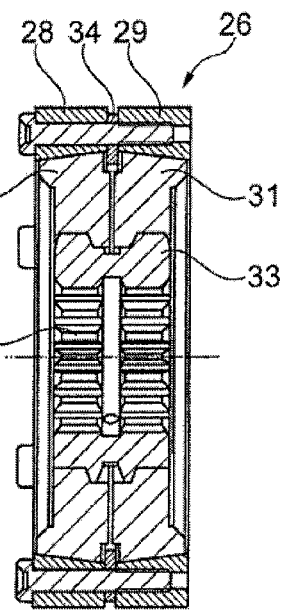
FIG. 11 shows a sectional illustration through the closed friction surface clutch from FIG. 7 in accordance with the section B-B in FIG. 10.

In the case of a double cone clutch 26 which is closed or is not switched from the outside in accordance with FIG. 11, no air gap exists between the friction surfaces of the two friction surface pairs 30, 28 and 31, 29, and the two inner cones 30, 31 which are moved axially to the outside away from the center part 33 are spaced apart axially from the release plate 34.

Figure 12:
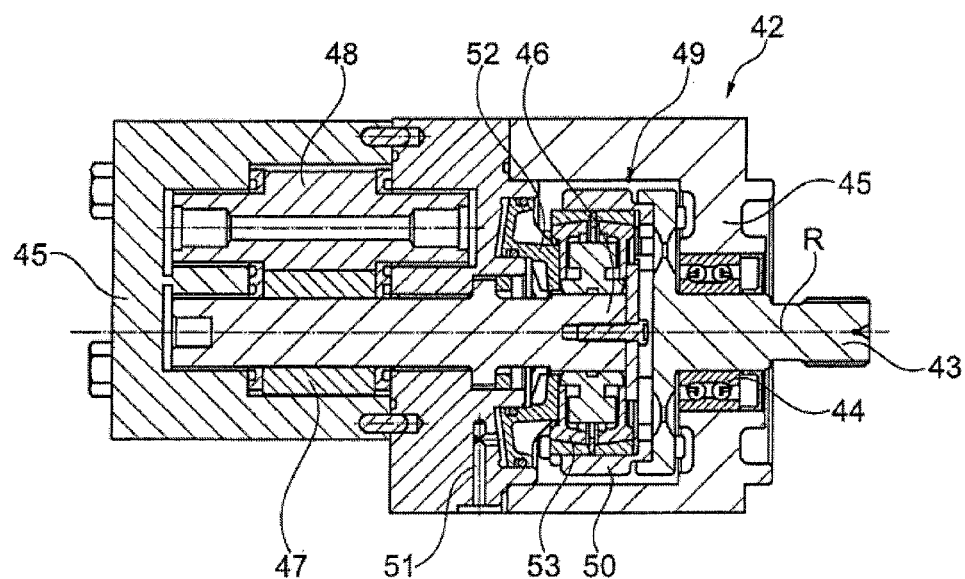
FIG. 12 shows a hydraulic pump according to the present invention.

FIG. 12 shows a hydraulic gear pump 42 according to the present invention with a drive shaft 43 which can be rotated about a rotational axis R, a ball bearing 44, a housing 45, a pump shaft 46 with a shaft gear 47, and a drivable countershaft 48.

The gear pump 42 is selectively driven or not driven by way of a self-boosting double cone clutch 49 according to the present invention with a cone driver 50. To this end, an actuating piston 52 is actuated hydraulically or moved axially via a hydraulic line 51, which actuating piston 52 acts on an inner cone 53.

Figure 13:
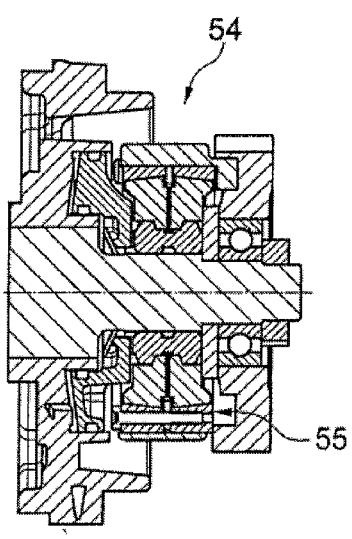
FIG. 13 shows a flange for an air compressor according to the present invention with an end section of a crankshaft.

FIG. 13 shows an image detail of an air compressor 54 according to the present invention with a mounting flange with a section of a drive side of a crankshaft. The air compressor 54 can be switched on and off by way of a double cone clutch 55 in accordance with the double cone clutch 26 depending on the rotational direction of a driveshaft.

Figure 14:
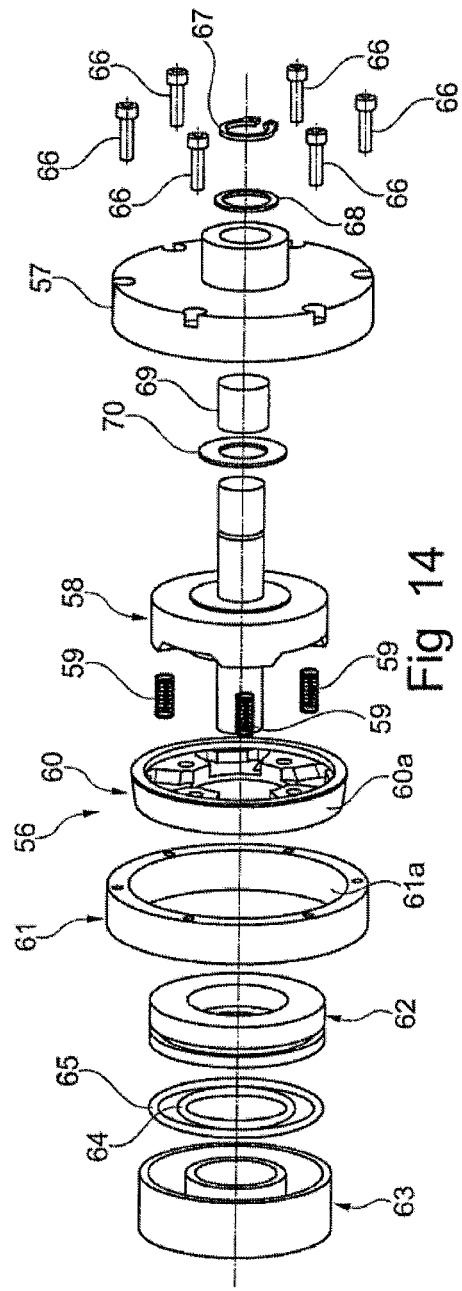
FIG. 14 shows a friction surface clutch according to the present invention which is configured as a single cone clutch, in an exploded illustration.
Figure 15:
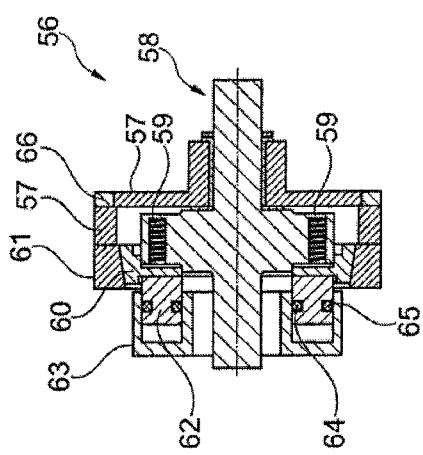
FIG. 15 shows the assembled single cone clutch in section.

A single cone clutch 56 according to the present invention which operates in terms of the essential features in accordance with the double cone clutch 2 with torque boosting is shown in FIGS. 14 and 15. In the axial direction, the single cone clutch 56 comprises a rotor 57, a shaft 58, four compression springs 59 between the shaft 58 and an inner cone 60 with a friction lining 60a, an outer cone 61 with a friction lining 61a, and a piston 62 with a cylinder 63, between which annular seals 64, 65 are provided. Moreover, there are six screws 66 on the rotor 57, and there are an axial securing ring 67 and an axial bearing 68 on one side, and there are a radial bearing 69 and an axial bearing 70 on the other side which is directed toward the shaft 58. The screws 66 engage through the rotor 57 and the outer cone 61.

The piston 62 serves to switch the single cone clutch 56 in a manner which is controlled from the outside, by the piston 62 pressing against the inner cone 60 in the axial direction, in order to move the inner cone 60 out of the frictionally locking connection.

The single cone clutch 56 has a plurality of ramp-shaped part guide surfaces on the shaft 58 and a plurality of associated part countersurfaces on an inner side of the inner cone 60, which surfaces act, in a manner which corresponds with the double cone clutch 2, for a self-boosting transmission of torque in both rotational directions without a freewheel function but with a radial play between the inner cone 60 and the shaft 58.

An embodiment of the single cone clutch 56 with a freewheel function in accordance with the double cone clutch 26 is likewise possible.

LIST OF DESIGNATIONS

1 Friction switching clutch
2 Double cone clutch
3 Cone driver
4 Outer cone

4a Friction surface
5 Outer cone
5a Friction surface
6 Inner cone
6a Friction lining
6b Bore surface
7 Inner cone
7a Friction lining
7b Bore surface
8 Release plate
9 Compression spring
10 Center part
10a Cylindrical surface
11 Screw
12 Internal threaded bore
13 Slot
14 Blind bore
15 Guide surface
16 Countersurface
17 Guide surface
17a Part guide surface
17b Part guide surface
18 Countersurface
18a Part countersurface
18b Part countersurface
19 Spline system
20 Shaft receptacle
21 Pedestal
22 Depression
23 Base area
24 Pedestal
25 Depression
26 Double cone clutch
27 Cone driver
28 Outer cone
29 Outer cone
30 Inner cone
30a Clutch lining
30b Main body
31 Inner cone
31a Clutch lining
32 Compression spring
33 Center part
34 Release plate
35 Screw
36 Guide surface
37 Countersurface
37 Guide surface
39 Countersurface
40 Spline contour
41 Blind bore
42 Gear pump
43 Drive shaft
44 Ball bearing
45 Housing
46 Pump shaft
47 Shaft gear
48 Countershaft
49 Double cone clutch
50 Cone driver
51 Hydraulic line
52 Actuating piston
53 Inner cone
54 Air compressor
55 Double cone clutch
56 Single cone clutch
57 Rotor
58 Shaft
59 Compression spring
60 Inner cone
61 Outer cone
61a Friction lining
62 Piston
63 Cylinder
64 Annular seal
65 Annular seal
66 Screw
67 Securing ring
68 Axial bearing
69 Radial bearing
70 Axial bearing

The invention claimed is:

1. A friction surface clutch having at least two friction surfaces which can be moved into a frictionally locking connection, comprising a conical friction surface pair with an inner friction surface element and an outer friction surface element, wherein the inner friction surface element is mounted such that it can be displaced in an axial direction with respect to a rotational axis, and such that the frictionally locking connection can be set up and canceled in a manner which is dependent on the axial displacement position of the inner friction surface element, wherein the inner friction surface element is coupled to a transmission element that is separate from the inner friction surface element such that the inner friction surface element and the transmission element can be rotated jointly about the rotational axis, wherein the coupling is set up via a bearing contact between a guide surface on the inner friction surface element and a countersurface on the transmission element, and wherein the guide surface on the inner friction surface element is formed by a plurality of elevations and depressions alternately extending annularly around the rotational axis, with the elevations and the depressions of the guide surface on the inner friction surface element having a flat shaped radially extending surface that extends in a direction perpendicular to the axial direction, respectively, such that each elevation is connected to both immediately adjacent depressions by a ramp shaped guide surface therebetween, and the countersurface on the transmission element is formed by a plurality of depressions and elevations alternately extending annularly around the rotational axis, with the depressions and the elevations of the countersurface on the transmission element having a flat shaped radially extending surface that extends in the direction perpendicular to the axial direction, respectively, such that each depression is connected to both immediately adjacent elevations by a ramp shaped countersurface therebetween, and the flat shaped radially extending surfaces of the depressions and the elevations and the ramp shaped countersurfaces therebetween of the countersurface on the transmission element are adapted to radially and circumferentially contact the flat shaped radially extending surfaces of the elevations and the depressions and the ramp shaped guide surfaces therebetween of the guide surface on the inner friction surface element with respect to the rotational axis, respectively, whereby, in the assembled state, the guide surface on the inner friction surface element and the countersurface on the transmission element are coupled, in a fitting manner therebetween, such that at least one spring is configured to pass through a passage through-hole, which extends through at least one depression of the countersurface on the transmission element in the axial direction, that positions the at least one spring in the at least one depression of the countersurface on the transmission element, and an end of the at least one spring is received and held in a blind bore in a corresponding elevation, which is directly opposite to the at least one depression of the countersurface on the transmission element, of the guide surface on the inner friction surface element and the flat shaped radially extending surfaces of the elevations and the depressions of the guide surface on the inner friction surface element abut flatly against the flat shaped radially extending surfaces of the depressions and the elevations of the countersurface on the transmission element, and in the case of driving of the inner friction surface element by way of friction between the at least two friction surfaces, an axial displacement movement of the inner friction surface element takes place in one direction, such that the frictionally locking connection between the inner friction surface element and the outer friction surface element can be reinforced.

2. The friction surface clutch according to claim 1, wherein the transmission element can be connected fixedly to a rotor which can be rotated about the rotational axis, so as to rotate with said rotor.

3. The friction surface clutch according to claim 1, wherein the transmission element is present axially between two inner friction surface elements.

4. The friction surface clutch according to claim 3, wherein the at least one spring passes through the transmission element and is between the two inner friction surface elements.

5. The friction surface clutch according to claim 4, wherein the at least one spring is a compression spring.

6. The friction surface clutch according to claim 4, wherein the at least one spring passes through the transmission element and comes into contact on both sides of the transmission element with a respective associated inner friction surface element.

7. The friction surface clutch according to claim 1, wherein the guide surface on the inner friction surface element and the countersurface on the transmission element are configured in such a way that, starting from an axial stop position of the inner friction surface element in the direction of the transmission element, in the case of the frictionally locking connection being set up by way of the at least one spring independently of the rotational direction of the outer friction surface element and therefore independently of the rotational direction of the inner friction surface element relative to the transmission element, the axial displacement movement of the inner friction surface element leads to a reinforcement of the frictionally locking connection between the inner friction surface and the outer friction surface.

8. The friction surface clutch according to claim 1, wherein the guide surface on the inner friction surface element and the countersurface on the transmission element are configured in the manner of wedge angle surfaces.

9. The friction surface clutch according to claim 1, wherein the guide surface on the inner friction surface element and the countersurface on the transmission element are configured in the manner of crossed wedge angle surfaces, in particular with a wedge angle of approximately 40-50 angular degrees.

10. The friction surface clutch according to claim 1, wherein a frictionally locking connection of the conical friction surface pair can be released by way of a one-sided force actuation.

11. An ancillary unit of a motor vehicle having an internal combustion engine, comprising a friction surface clutch according to claim 1, via which friction surface clutch the ancillary unit can be connected to a drive.

\* \* \* \* \*